(12) United States Patent
Allotta et al.

(10) Patent No.: US 11,505,293 B2
(45) Date of Patent: Nov. 22, 2022

(54) UNDERWATER VEHICLE WITH VARIABLE CONFIGURATION

(71) Applicant: Universita' Degli Studi di Firenze, Florence (IT)

(72) Inventors: Benedetto Allotta, Florence (IT); Jonathan Gelli, Florence (IT); Marco Pagliai, Florence (IT); Alessandro Ridolfi, Florence (IT)

(73) Assignee: Universita' Degli Studi di Firenze, Florence (IT)

( * ) Notice: Subject to any disclaimer, the term of this patent is extended or adjusted under 35 U.S.C. 154(b) by 49 days.

(21) Appl. No.: 17/262,714

(22) PCT Filed: Jul. 23, 2019

(86) PCT No.: PCT/IB2019/056266
§ 371 (c)(1),
(2) Date: Jan. 23, 2021

(87) PCT Pub. No.: WO2020/021442
PCT Pub. Date: Jan. 30, 2020

(65) Prior Publication Data
US 2021/0300513 A1 Sep. 30, 2021

(30) Foreign Application Priority Data
Jul. 24, 2018 (IT) .......................... 102018000007463

(51) Int. Cl.
*B63C 11/52* (2006.01)
*B63G 8/00* (2006.01)
(Continued)

(52) U.S. Cl.
CPC .............. *B63C 11/52* (2013.01); *B63G 8/001* (2013.01); *B63G 8/16* (2013.01);
(Continued)

(58) Field of Classification Search
CPC . B63G 8/00; B63G 8/001; B63G 8/16; B63G 2008/002; B63C 11/00; B63C 11/52; B63B 2001/045; B63B 2001/145
(Continued)

(56) References Cited

U.S. PATENT DOCUMENTS 4,502,407 A * 3/1985 Stevens .................. B63G 8/001
114/222

FOREIGN PATENT DOCUMENTS

CN 101870352 7/2012
EP 3250345 12/2017
(Continued)

OTHER PUBLICATIONS

International Search Report dated Oct. 9, 2019.
(Continued)

*Primary Examiner* — Lars A Olson
(74) *Attorney, Agent, or Firm* — Preston Smirman; Smirman IP Law, PLLC

(57) ABSTRACT

The underwater vehicle with variable configuration (1) comprises: a hull (2) consisting of at least four elongated elements (20), mutually articulated by means of joints (21), to form a first closed polygonal structure (F1), arranged on a plane; thrusters (3), associated in parallel with said elements (20) of the hull (2); actuating means (22), associated with said joints (21), provided for automatically modifying said first closed polygonal structure (F1), from an elongated shape configuration (AF1) to an expanded shape (EF1), corresponding to an elongated conformation of said hull (2), to determine a low hydrodynamic resistance and a longitudinal thrust of the thrusters (3) in the cruising of said underwater vehicle (1), and to a substantially isotropic conformation, wherein the same elements (20) of the hull (2), as well as the thrusters (3) are mutually angled, intended for the hovering of the same underwater vehicle (1), respectively. The latter can be suitably equipped with robotic arms (4) intended for performing maintenance or similar interventions in underwater locations.

10 Claims, 4 Drawing Sheets

(51) Int. Cl.
    *B63G 8/16*     (2006.01)
    *B63B 1/04*     (2006.01)
    *B63B 1/14*     (2006.01)

(52) U.S. Cl.
    CPC ... *B63B 2001/045* (2013.01); *B63B 2001/145* (2013.01); *B63G 2008/002* (2013.01)

(58) Field of Classification Search
    USPC .......................................................... 114/312
    See application file for complete search history.

(56) References Cited

FOREIGN PATENT DOCUMENTS

| | | | | |
|---|---|---|---|---|
| EP | 3145735 B1 * | 3/2020 | ............ | B63G 8/001 |
| KR | 101642494 | 7/2016 | | |

OTHER PUBLICATIONS

Written Opinion of the International Searching Authority dated Oct. 9, 2019.
International Preliminary Report on Patentability dated Jan. 26, 2021.
English Abstract of KR101642494.
English Abstract of CN101870352.

* cited by examiner

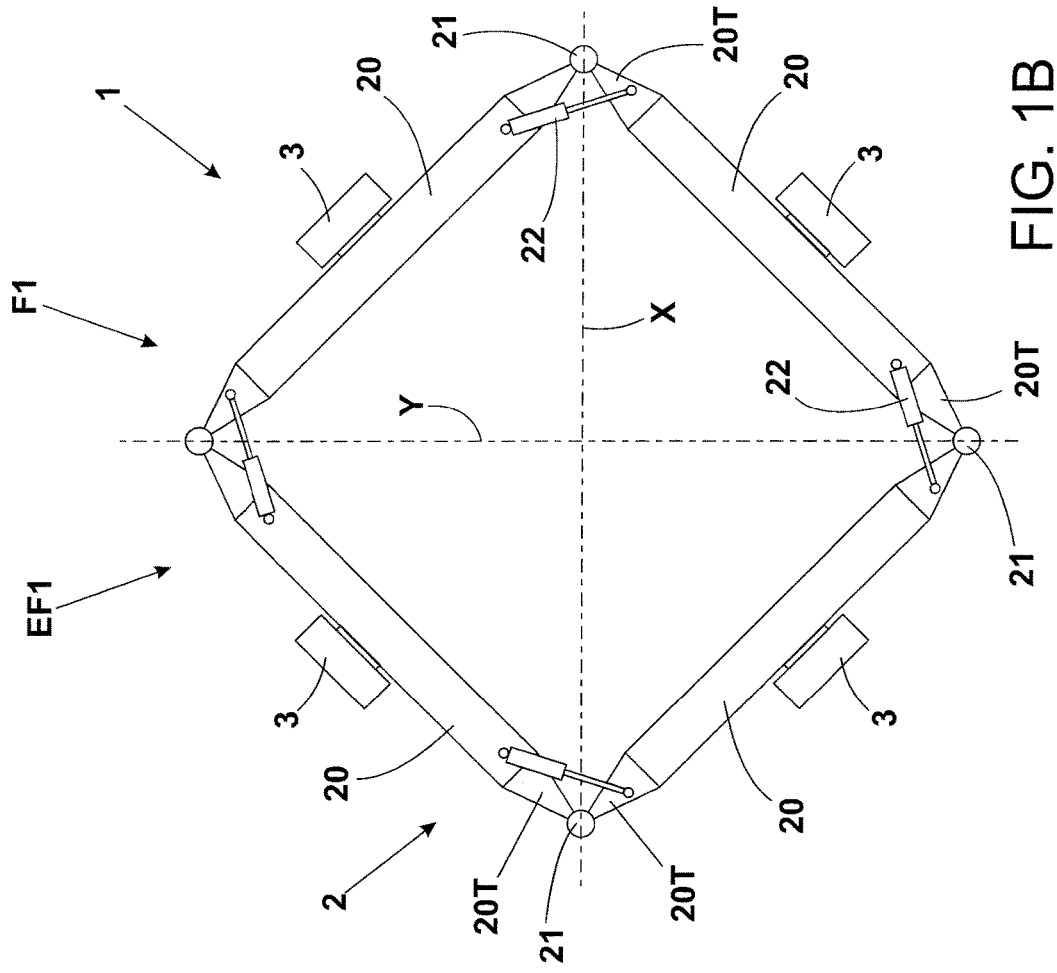
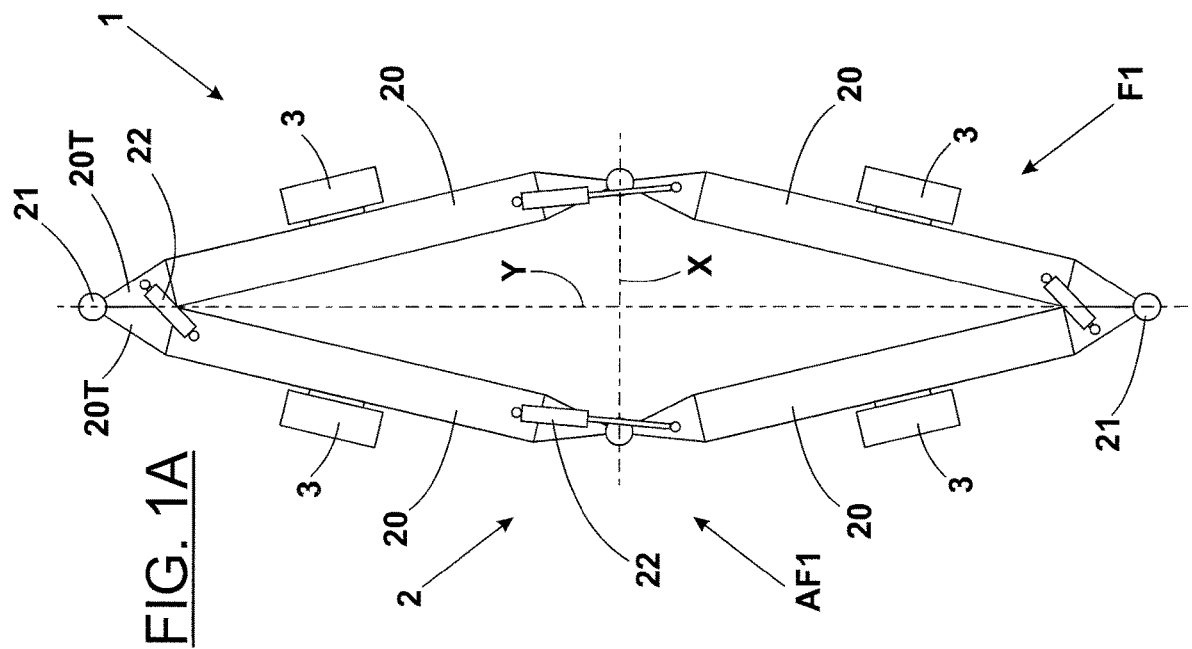

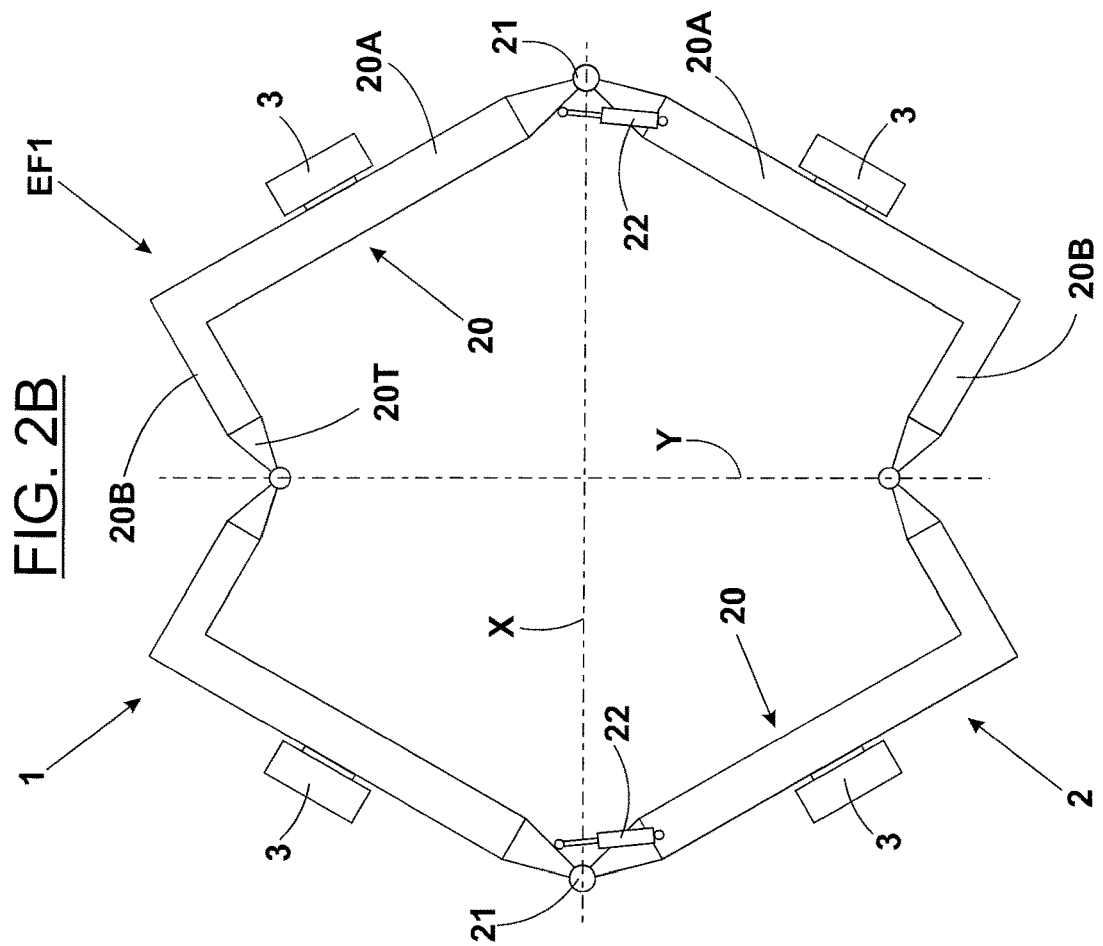
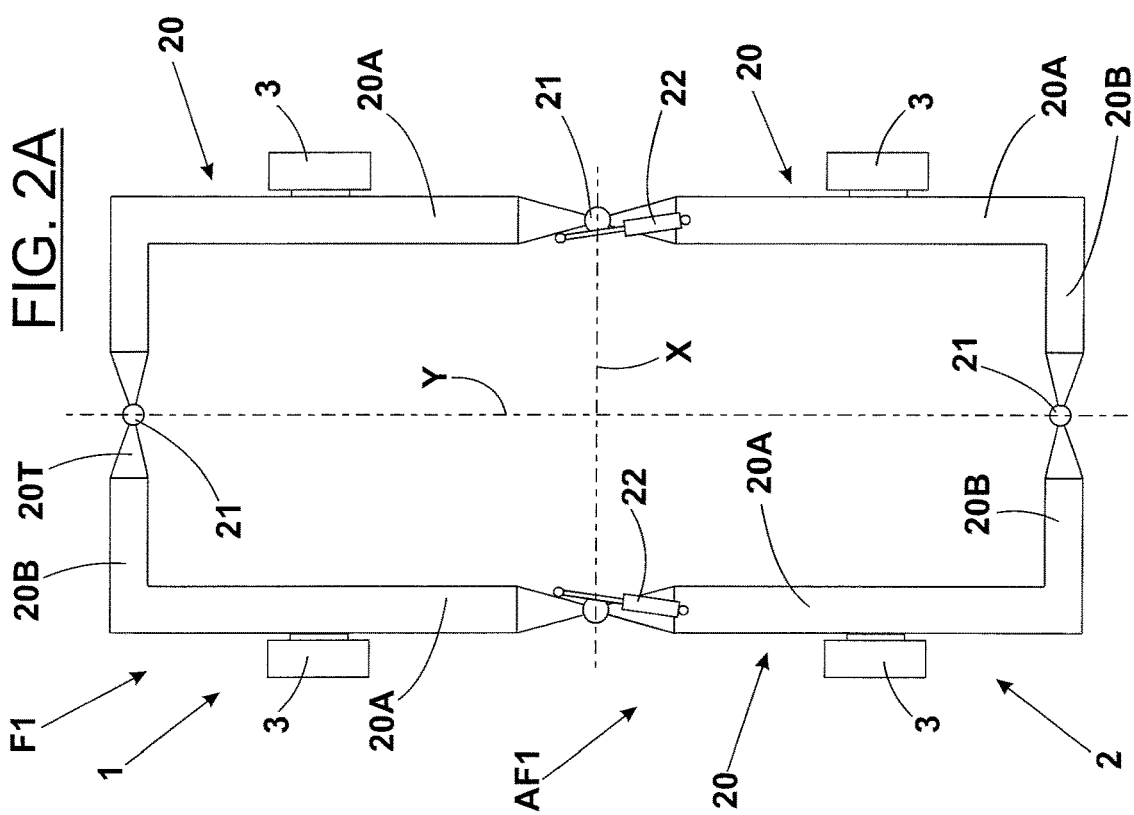

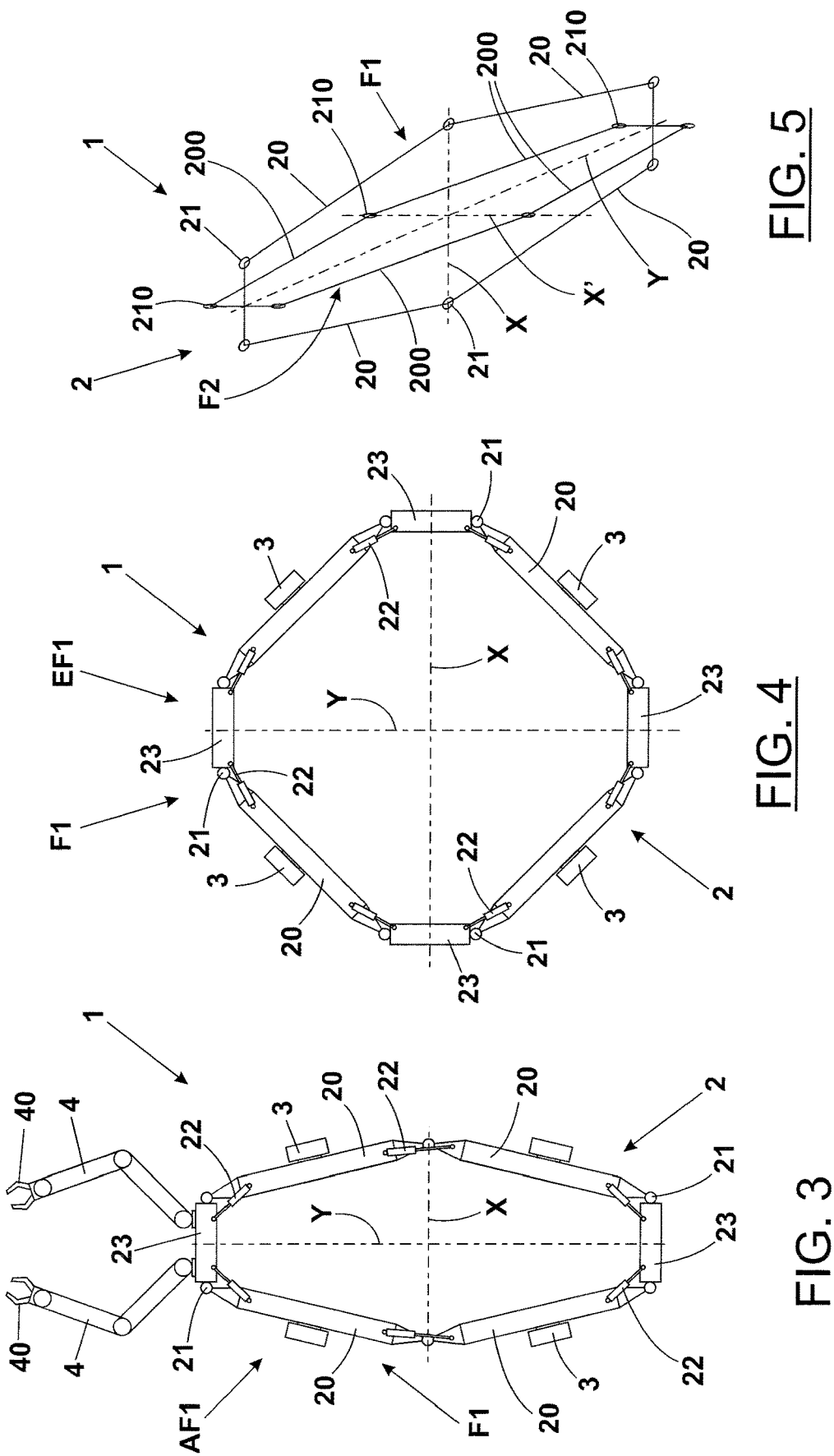

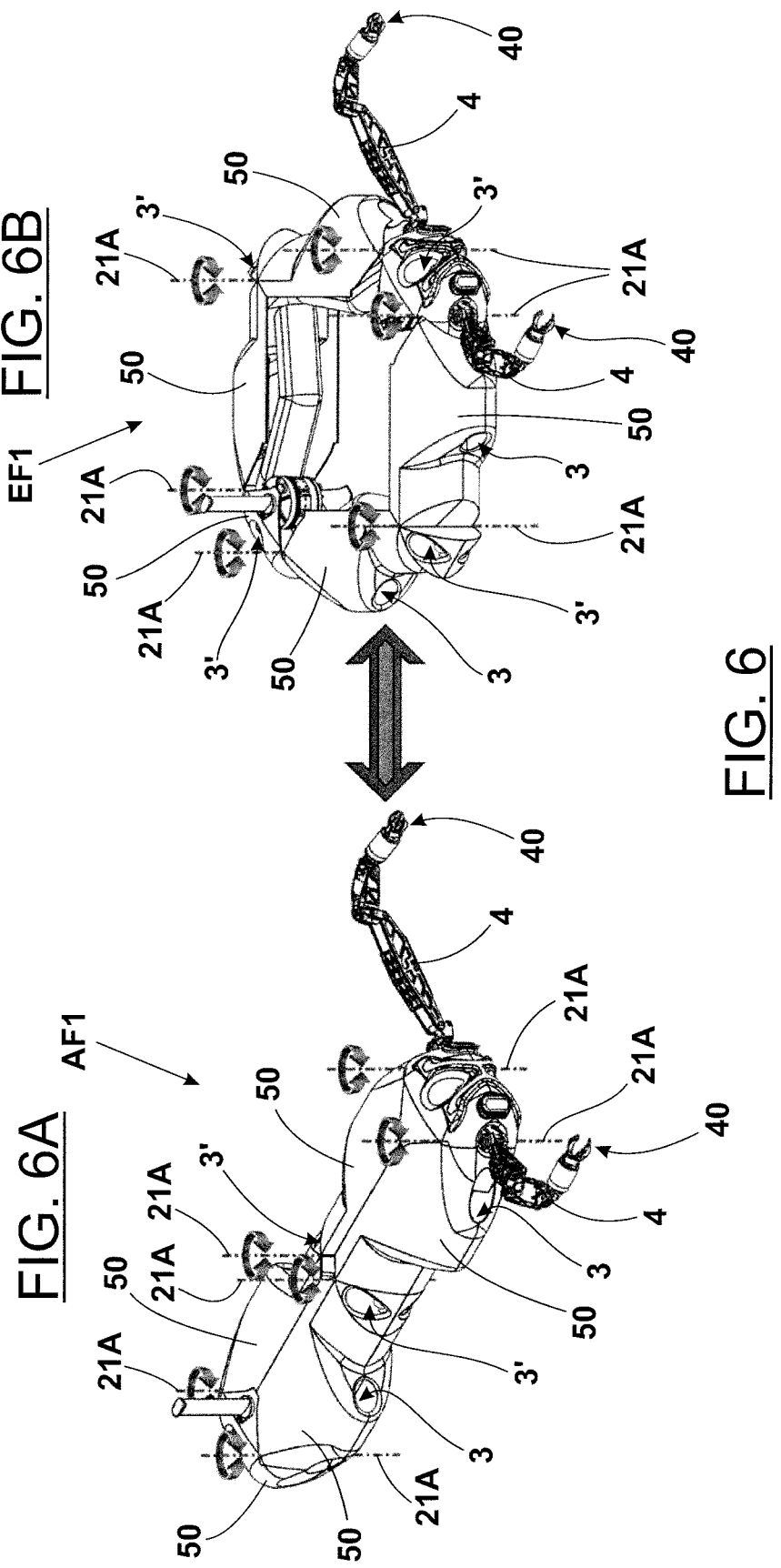

UNDERWATER VEHICLE WITH VARIABLE CONFIGURATION

CROSS-REFERENCE TO RELATED APPLICATION

The instant application is a national phase of PCT International Application No. PCT/IB2019/056266, filed Jul. 23, 2019, and claims priority to Italian Patent Application Serial No. 102018000007463 filed Jul. 24, 2018, the entire specifications of both of which are expressly incorporated herein by reference.

TECHNICAL FIELD

The present invention relates to the technical field of underwater vehicles with variable configuration. The invention particularly relates to robotic underwater vehicles with variable configuration, used for surveillance and/or inspection and/or intervention operations not designed to have a driver and/or other staff on board, known as UUV (Unmanned Underwater Vehicles).

STATE OF THE ART

Underwater robotic vehicles are constructed with different characteristics depending on the operating needs for which they are intended.

When the purposes are bathymetric survey/surveying or other, where the vehicle is expected to cover significant distances with a good speed, it is useful to have an elongated, e.g. a torpedo-like, conformation offering low hydrodynamic resistance.

According to an acronym known in the field, in this case, they are usually referred to as AUVs (Autonomous Underwater Vehicles), i.e. autonomous vehicles.

On the contrary, when the purposes are on-site inspection and intervention, the vehicle ability of hovering in a certain position with the best possible stability is pursued, therefore an almost isotropic shape is more advantageous; moreover, it is necessary to provide for the presence of motors adapted to thrust in several directions, in order to counteract the underwater currents and to keep the vehicle in trim and/or to be able to move easily in all directions, e.g. for an inspection task. When only inspection activities take place AUVs (obviously of almost isotropic shape) can still be used, whereas for on-site intervention activities it is necessary to resort to wire-guided ROVs (Remotely Operated Vehicles) or on-board piloting vehicles.

It is easy to understand that for many operating situations it would be appropriate to have an underwater robotic vehicle combining an efficient hydrodynamic shape, for fast transports, with a high hovering stability, when on-board instruments are to be used for interventions of various nature and for having an ease of movement in the various directions.

In the prior document KR101642494, an underwater vehicle aimed at obtaining a correct hydrodynamic shape combined with good stability in hovering is disclosed.

To this end, an underwater vehicle with a substantially torpedo shape, having a plurality of thrusters distributed in the longitudinal direction which can be manually oriented independently of each other, is disclosed and protected; when cruising is needed, all the thrusters are oriented to thrust in the axial direction, whereas when hovering is needed each thruster is rotated according to an axis orthogonal to the thrust axis, so as to direct the latter in the most appropriate direction to counteract the underwater currents and to keep the vehicle trim as stable as possible.

Due to the elongated torpedo shape, the greater or lesser stability of the hovering vehicle is influenced by how it is oriented with respect to the underwater current by which it is affected, i.e. by how much surface is exposed to said current, and the thrusters, especially since they cannot be steered while cruising, cannot be equally effective in every possible situation during counteract.

In the other prior document EP3250345 an underwater vehicle shaped in a snake like form is described and defended, consisting of a series of consecutive arms mutually articulated to each other in a hinge.

In at least part of said arms thrusters are provided, which, due to their orientation with respect to the others, can altogether define a rectilinear or curved cruising direction for the vehicle, i.e. a more compact form of the vehicle in search of a hovering stability.

Obviously, the open shape of the vehicle body does not allow a good resistance to the current thrusts in said hovering, and the thrusters, due to the position and trim they happen to be in, may be of reduced effectiveness.

In the further prior document CN 101870352B, a variable configuration structure for underwater vehicles is described and claimed, consisting of a sort of frame formed by a plurality of articulated parallelograms, arranged crown like, with said frame positioned centrally to the structure on a plane perpendicular to the longitudinal axis thereof.

Symmetrically to said crown frame, in front and behind it, there are respective rings, concentric to the frame itself, connected to the latter by means of articulated and arched arms, in a longitudinal rib like form.

The crown frame, by means of the articulated parallelograms, may assume a coiled configuration, with a smaller diameter, and an expanded one, with a larger diameter; as a result of this variation in shape, the front and rear rings, interconnected by means of said arched arms, are respectively moved apart or toward each other, so that the structure can shift from an ogive to an almost spherical configuration.

Details regarding the thrusters are not provided in the document, therefore it should be presumed that their trim is not affected by the change in shape of the vehicle allowed by the structure; for the latter it is not further specified who provides to constitute the external shroud, whether rigid or flexible, and how it could adapt to the shape variations of the structure itself.

An underwater vehicle is also commercially available in which shroud parts are moved from closed to open positions.

In the first configuration, an elongated and smooth shape of the hull is provided, with operating organs enclosed within, suitable for cruising.

Upon reaching the predetermined position, the shrouds are opened allowing the robotic arms, cameras and the like to exit.

During any change of configuration, the position and orientation of the thrusters remain unchanged, therefore a limited possibility of counteracting underwater currents and other external interferences in order to stabilize the hovering vehicle should be assumed.

SUMMARY OF THE INVENTION

Object of the present invention is therefore to propose an underwater vehicle with variable configuration having multi-purpose qualities, such as to be able to effectively perform surveillance tasks, such as those carried out by AUVs (Autonomous Underwater Vehicles) with a substantially torpedo shape, rapidly covering also significant distances and, alternatively or additionally, on-site inspection and/or intervention operations, hovering in constant trim and with the possibility of counteracting the underwater currents, becoming in this case a so-called isotropic vehicle in the manner of the current ROVs (Remotely Operated Vehicle), i.e. in such a manner not only to allow a good trim to be maintained without moving, but also to obtain good local mobility, not depending on the specific direction, and better manipulability ellipsoids in strength and speed.

Furthermore an object of the invention provides that the underwater vehicle has, according to said multiple functions, a shape of the hull with low hydrodynamic resistance when surveying and/or surveillance functions are performed, and a shape that favors the hovering trim when it has to perform close inspection and/or intervention activities in a given area.

Another object of the invention is to obtain the pre-established variations of shape of the hull, for the surveying/surveillance or inspection/intervention configuration, with simple commands applied also remotely that concurrently and consequently modify also the thrust direction given by the thruster assemblies, making it optimal now for the one now for the other of said configurations.

A further object of the invention is to make the underwater vehicle with substantially modular elements, so as to be able to vary the shape of the hull also according to specific needs, while maintaining the original features.

Yet another object of the invention provides the hull to obtain such a conformation that one or more robotic arms/manipulators can be easily applied to it.

Another further object of the invention provides that the main elements composing the hull, besides being modular, are also watertight at significant pressures, so as to be able to have within them compartments suitable for housing tools, instruments, batteries, control units and other.

These and other objects are fully achieved by means of an automatically guided underwater vehicle, of the type comprising at least one hull to which thrusters are associated for moving and maneuvering in water of said underwater vehicle, which comprises:

at least four elongated elements, provided for defining said hull and mutually articulated in correspondence with the respective ends by means of joints, to form at least one first closed polygonal structure, arranged on a plane and centered with respect to two orthogonal symmetry axes;

at least one thruster, associated with each of said elements of the hull and designed to provide a direct propulsive thrust with a given angle of inclination with respect to the longitudinal axis of the respective element in the plane identified by the aforementioned closed polygonal structure;

actuating means, associated with said hinged joints, provided for varying and stabilizing a predetermined angle between two respective consecutive elements of the hull, so as to obtain, for said first closed polygonal structure, at least two characteristic configurations, one with an elongated shape and one with expanded shape, to which a first elongated conformation with reduced cross-section of said hull, wherein said elements of the hull are arranged almost parallel to each other, to determine a low hydrodynamic resistance in the cruising of said underwater vehicle, and a second substantially isotropic configuration, wherein the same elements of the hull are mutually angled, intended for the hovering of the same underwater vehicle, correspond, respectively.

BRIEF DESCRIPTION OF THE DRAWINGS

The characteristics of the invention will become apparent from the following description of a preferred embodiment of the underwater vehicle with variable configuration in question, according to what is proposed in the claims and with the aid of the attached drawings, wherein:

FIG. 1A illustrates, in a schematic plan view, an underwater vehicle according to the invention, with the hull consisting of four variable configuration elements, arranged in a first position;

FIG. 1B illustrates the underwater vehicle of FIG. 1A with the elements of the hull arranged in a second position;

FIG. 2A illustrates, in a schematic plan view, an underwater vehicle with the elements of the hull of different shape, arranged in a first position;

FIG. 2B illustrates the underwater vehicle of FIG. 2A with the elements of the hull arranged in a second position;

FIG. 3 illustrates, in a schematic plan view, an alternative embodiment of the underwater vehicle as shown in FIGS. 1A, 1B, with two robotic arms associated;

FIG. 4 illustrates, in a schematic plan view, a second alternative embodiment of the underwater vehicle;

FIG. 5 illustrates schematically, in axonometric projection, a different embodiment of the underwater vehicle, with elements of the hull arranged on two orthogonal planes;

FIG. 6 shows in a perspective view an underwater vehicle of the invention according to the alternative embodiment of FIG. 3: FIG. 6A shows the vehicle in a configuration suitable for surveying/surveillance, FIG. 6B shows the vehicle in a configuration suitable for inspection/intervention.

DESCRIPTION OF THE PREFERRED EMBODIMENTS

In the above-listed figures it is indicated as a whole, with the reference 1, an underwater vehicle with variable configuration, of the type not designed to have a driver and/or other staff on board.

The underwater vehicle 1 is equipped with suitable programming means of the operating functions and/or remote control, not illustrated in detail, wired or wireless, adapted to control the respective operating functions in immersion.

The underwater vehicle 1, in a way known per se, comprises a hull 2 to which thrusters 3 are associated for moving and maneuvering in water, for example with propeller or water jet.

According to the invention, the hull 2 consists of at least four elongated elements 20, mutually articulated in correspondence with the respective ends 20T by means of joints 21, to form at least one first closed polygonal structure F1, arranged on a plane and centered with respect to two orthogonal symmetry axes X, Y.

In a first embodiment of the invention, illustrated in FIGS. 1A, 1B, four of the aforementioned elements 20 of the hull 2 are provided, having a torpedo shape, to each of which is associated at least one thruster 3, designed to provide a direct propulsive thrust substantially parallel to the longitudinal axis of the hull 2, in one direction and the opposite one.

Advantageously, the thrusters 3 are fixed laterally to the elements 20, on the external part with respect to said first closed polygonal structure F1, and are arranged in a fixed position with a thrust axis parallel to the longitudinal axis of the same respective element 20, or in any case with a given angle of inclination with respect to the aforementioned longitudinal axis of the element 20 in the plane identified by the closed polygonal structure F1.

To each of said joints 21 are associated actuating means 22, schematically illustrated, for example hydraulic or electric, provided for varying and stabilizing a predetermined angle between the two consecutive elements 20 between which they are interposed, so as to obtain, for said first closed polygonal structure F1, at least two characteristic configurations, of which one AF1, with an elongated shape (FIG. 1A) and one with an expanded shape EF1 (FIG. 1B).

Preferably, although not necessarily, the axes X, Y delimit two symmetrical halves of said configurations AF1, EF1, i.e. with the opposing angles equally paired two by two.

In the elongated shape configuration AF1 (FIG. 1A), the hull 2 has a first elongated conformation as a flattened rhombus, with a reduced cross-section along the axis X, wherein the elements 20 are arranged almost parallel to each other, in order to determine a low hydrodynamic resistance according to the longitudinal axis Y of the hull 2, advantageous during the cruising of said underwater vehicle 1.

Consequently, the four thrusters 3 are also arranged almost parallel to each other as well as to the longitudinal axis Y of the hull 2, so that their propulsive thrust is efficiently exploited.

In the expanded shape configuration EF1 (FIG. 1B), the hull 2 has a second conformation substantially isotropic with respect to the two axes X, Y, with a quadrangular shape, with the same elements 20 of the hull 2 arranged mutually angled; this configuration is selected in the hovering of the underwater vehicle 1, with the four thrusters 3 which are arranged almost orthogonally, so that by directing their propulsive thrusts in one direction or the other, maximum efficiency is obtained to counteract to possible underwater currents that tend to move and/or modify the vehicle trim 1.

In a second embodiment of the invention, illustrated in FIGS. 2A, B, four elements 20 are still provided to constitute the hull 2, each of which has two consecutive straight portions 20A, 20B, for example arranged at right angle.

Preferably, the portion 20A of each element 20, to which the relative thruster 3 is associated, has a greater development than the portion 20B.

The arrangement of the four elements 20, symmetrical with respect to the respective axes X, Y, determines that, in the elongated shape configuration AF1, the hull 2 has a relative first elongated conformation rectangular in shape (FIG. 2A) with the shorter side along the axis X, whereas in the expanded shape configuration EF1, for the same hull 2, it is determined a second conformation, still substantially isotropic, polygonal in shape (FIG. 2B).

For this second embodiment it is possible to provide only two actuating means 22, associated with the joints 21 arranged on the axis X.

The thrusters 3 are perfectly parallel with the longitudinal axis Y of the hull 2, when the latter is in an elongated shape configuration AF1 (FIG. 2A), whereas they are mutually angled, with the hull 2 in expanded shape configuration EF1 (FIG. 2B).

In a third embodiment of the invention, illustrated in FIG. 3 and derived from the above described first embodiment, two auxiliary supporting elements 23 are provided, each of which is interposed between two of said four elements 20 of the hull 2, in respective opposite positions, preferably located at the bow and stern of the hull 2.

Said auxiliary supporting elements 23 are connected to the elements 20 with the interposition of relative joints 21 and actuating means 22 similar to those mentioned with reference to the first embodiment.

At least one of said auxiliary supporting elements 23 is designed to support at least one robotic arm 4 equipped with operating tools 40.

With the introduction of the auxiliary supporting elements 23, the hull 2 has, in the elongated shape configuration AF1, a first elongated conformation hexagonal in shape flattened along the transversal axis X, whereas in the expanded shape configuration EF1, for the same hull 2, it is determined a second conformation, still substantially isotropic, polygonal in shape, not illustrated as it is quite similar to that of FIG. 1B.

In FIG. 6 the vehicle of the invention is shown in an embodiment which shows the same shape as the supporting structure of the solution of FIG. 3, wherein, however, the elements 20 and the auxiliary supporting elements 23 of the hull are covered with elements of the fairing 50. In FIG. 6A the vehicle is shown in the elongated shape configuration AF1, whereas in FIG. 6B the same vehicle is shown in the expanded shape configuration EF1. 21A indicates the axes of the joints 21 which are all parallel to one another and allow a variability in the plane of the vehicle configuration. In addition to the four thrusters 3 designed to provide a propulsive thrust in the direction of elongation of the element 20 of the hull 2 with which they are associated, there are four auxiliary thrusters 3', arranged to provide a propulsive thrust in the direction orthogonal to the plane identified by the polygonal figure defined by the hull 2. Two of the four auxiliary thrusters 3' are arranged in correspondence with the connecting joints 21 between two consecutive elements 20, whereas the other two auxiliary thrusters 3' are arranged in correspondence with the centerline of the auxiliary supporting elements 23. When the vehicle is in the elongated shape configuration AF1 suitable for surveying/surveillance activities, the four thrusters 3 are all arranged to provide a propulsive thrust in the direction of the longitudinal axis of the vehicle and the auxiliary thrusters 3' remain mainly inactive, as having the purpose of keeping the horizontal trim and the depth. When the vehicle is in the expanded shape configuration EF1 suitable for inspection/intervention activities the thrusters 3 continue to provide their propulsive thrust in the plane defined by the hull 2, but each thruster provides its thrust along an inclined direction with an angle of about 90° with respect to the adjacent thrusters in the closed kinematic chain defined by the hull 2. In the expanded configuration EF1 the arrangement of the thrusters 3 and the auxiliary thrusters 3' allows a high maneuverability of the vehicle and high hovering abilities. The elements of the fairing 50 are designed to meet the two requirements for optimizing the hydrodynamic coefficient of the vehicle in the elongated configuration AF1 and the stability of the same in the expanded configuration EF1.

In a fourth embodiment of the invention, illustrated in FIG. 4 and derived from the third, two further auxiliary supporting elements 23 are provided, interposed between the remaining two elements 20 of the hull 2.

The further auxiliary supporting elements 23 are connected to the corresponding elements 20 with the interposition of relative joints 21 and actuating means 22, similarly to what stated above.

Also, for this fourth embodiment, it is provided that at least one of said auxiliary supporting elements 23 is designed to support at least one robotic arm (not shown) equipped with operating tools.

With said further auxiliary supporting elements 23, the hull 2 has, in the elongated shape configuration AF1, a first elongated conformation octagonal in shape flattened along the transversal axis X, not shown as it is very similar to what shown in FIG. 3, whereas in the expanded shape configuration EF1 the same hull 2 is still with a substantially isotropic conformation, with an octagonal plan.

As regards the trim of the thrusters 3, it is possible to refer to what previously described.

For all the embodiments of the invention described hitherto by way of non-limiting example, it should be noted that the various actuating means 22, present in each of said embodiments, are obviously controlled in suitable coordination with one another, having always to verify that the sum of the internal angles of the closed polygonal structure F1 is the one resulting from the number of the sides thereof, i.e. of the elements 20 and of the auxiliary supporting elements 23 composing it.

In a different embodiment of the underwater vehicle 1, schematically illustrated in FIG. 5, the hull 2 is developed on two orthogonal planes, instead of just one as in the previous embodiments. Whereas in the embodiments previously described, during the passage from the elongated configuration AF1 to the expanded configuration EF1, the vehicle maintains a substantially flat structure, in the embodiment of FIG. 5 the vehicle has a three-dimensionally variable configuration.

To this end, at least four further elongated elements 200 are provided, mutually articulated in correspondence with the respective ends by means of joints 210, to form a second closed polygonal structure F2, arranged on a plane perpendicular to that on which said first closed polygonal structure F1 lies, passing through the longitudinal axis Y of the same hull 2.

The aforementioned joints 210 are associated with relative actuating means, similar to the others described and not illustrated.

The elements 20 of the second closed polygonal structure F2 are suitably interconnected with those of the first structure F1, and arranged symmetrically with respect to the relative axes, of which the longitudinal axis Y is communal whereas the transversal axis X' is perpendicular to the axis X.

Advantageously, said further at least four elements 200 of the hull 2 are also provided with the relative thrusters not shown in FIG. 5.

As can be intuitively understood, also for the latter embodiment the described configurations with elongated and expanded shape, not shown in detail, are provided, impressed simultaneously to both said first and second closed polygonal structures F1, F2.

The embodiment of FIG. 5 allows to obtain a three-dimensionally variable configuration which further increases the stability in water both from the hydrostatic point of view and in the case of exchange of forces with the outside, for example during intervention tasks.

Advantageously, the elements 20 of the hull 2 are watertight and are provided for housing equipment and/or tools and/or instruments (not shown) of the same underwater vehicle 1. Alternatively, the elements 20 have exclusively a supporting structural function and any housings, whether watertight or not, are formed in the elements of the fairing 50 or externally associated with the elements 20.

To optimize the boating performances of the underwater vehicle 1, it is possible to provide hydrodynamic protuberances (not shown) externally projecting from the elements 20, 200 of the hull 2, of the fixed type designed to improve the stability and the trim of the underwater vehicle 1, and/or of the mobile type, by means of actuators thereof, intended to steer the same underwater vehicle 1 while cruising.

The description above shows in an extremely apparent manner the peculiar and innovative characteristics of the underwater vehicle with variable configuration object of the present invention, which, differently from what is proposed in the known art, actually possesses multi-purpose qualities, such as to be able to effectively perform surveying and/or surveillance tasks, rapidly covering also significant distances and, alternatively or additionally, on-site inspection and/or intervention operations, hovering in constant trim and with the possibility of counteracting the underwater currents and with high maneuverability in narrow spaces, becoming in this case a compact vehicle, in the manner of the so-called ROVs (Remotely Operated Vehicles).

The multiple functions of the underwater vehicle are obtained in the best possible way by providing variable configurations of the shape of the hull, which advantageously has a low hydrodynamic resistance when surveying/surveillance functions are performed, and an isotropic shape that favors the hovering trim and the maneuverability when it has to perform close inspection and/or intervention activities.

It should be noted that an underwater vehicle with variable configuration according to the present invention could be an on-board piloting vehicle, a remotely controlled vehicle, for example wire-guided, or even a programmed fully automatic guided vehicle. In any case, an important advantageous aspect of the invention consists in the possibility of varying the shape of the hull, for the AUV-like or ROV-like configuration, in an automatic way and, in a consequently automatic manner, the thrust directions of the thruster assemblies are also modified, in order to obtain the best performance.

The proposed underwater vehicle, as can be deduced from the description above, is advantageously comprised of modular elements, in order to have maximum freedom in constructing the hull according to specific needs, such as for example the application of one or more robotic arms.

It is understood, however, that what is described above has a non-limiting example value, therefore any detail variation that may become necessary for technical and/or functional reasons are now considered to fall within the same protective scope defined by the following claims.

The invention claimed is:

1. An underwater vehicle with variable configuration of a type comprising at least one hull to which thrusters are associated for moving and maneuvering in water the underwater vehicle, comprising:

at least four elongated elements, provided for defining the hull and mutually articulated in correspondence with respective ends by means of joints, to form a first closed polygonal structure, arranged on a plane and centered with respect to two orthogonal symmetry axes;

at least one thruster, associated with each of the elements of the hull and designed to provide a direct propulsive thrust with a given angle of inclination with respect to a longitudinal axis of the respective element in the plane identified by the first closed polygonal structure; and actuating leans, associated with the joints, provided fat varying and stabilizing a predetermined angle between two respective consecutive elements of the hull, so as to obtain, for the first closed polygonal structure, at least two characteristic configurations, one with an elongated shape and one with expanded shape, to which a first elongated conformation with a reduced cross-section of the hull corresponds, in which the elements of the hull are arranged almost parallel to each other, and a second substantially isotropic conformation, wherein the elements of the hull are mutually angled, intended for hovering of the underwater vehicle, respectively.

2. The underwater vehicle according to claim 1, further comprising two auxiliary supporting elements, each of which are interposed between two of the elements of the hull, in respective opposite positions, with at least one of the auxiliary supporting elements supporting at least one robotic arm equipped with operating tools.

3. The underwater vehicle according to claim 1, wherein the hull is provided with at least four additional elongated elements, mutually articulated in correspondence with respective ends by means of joints, to form a second closed polygonal structure, arranged on a plane perpendicular to that on which the first closed polygonal structure lies and interconnected to the latter, the second closed polygonal structure being centered with respect to two relative orthogonal symmetry axes.

4. The underwater vehicle according to claim 3, further comprising additional actuating means, associated with the joints interposed between the four additional elongated elements of the hull, provided for varying and stabilizing the angles between the latter, so as to obtain, for the second closed polygonal structure, at least two characteristic configurations, respectively with elongated and expanded shape, defined in a combination with the corresponding elongated shape and expanded shape configurations of the first closed polygonal structure.

5. The underwater vehicle according to claim 3, wherein the thrusters are associated with the respective elements of the hull, outside the corresponding first or second closed polygonal structure, and designed to provide a propulsive thrust in a first direction and in a second opposite direction.

6. The underwater vehicle according to claim 1, wherein the elements of the hull are watertight and are provided for housing equipment, tools or instruments of the underwater vehicle.

7. The underwater vehicle according to claim 1, further comprising hydrodynamic protuberances externally projecting from the elements of the hull.

8. The underwater vehicle according to claim 7, wherein the hydrodynamic protuberances are of a fixed type and are provided for stabilizing a trim system of the underwater vehicle.

9. The underwater vehicle according to claim 7, wherein the hydrodynamic protuberances are adjustable by means of actuators thereof, and they are intended to steer the underwater vehicle.

10. The underwater vehicle according to claim 1, further comprising remote control means adapted to control the respective operating functions.

* * * * *